(12) United States Patent
Sticchi et al.

(10) Patent No.: US 10,190,521 B2
(45) Date of Patent: Jan. 29, 2019

(54) DETERMINATION OF NITROGEN OXIDE CONCENTRATION IN ENGINE EXHAUST GAS

(71) Applicant: GM GLOBAL TECHNOLOGY OPERATIONS LLC, Detroit, MI (US)

(72) Inventors: Giorgio Sticchi, Maglie (IT); Francesco Castorina, Turin (IT); Andrea Dutto, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 15/608,501

(22) Filed: May 30, 2017

(65) Prior Publication Data

US 2018/0347495 A1    Dec. 6, 2018

(51) Int. Cl.
| | |
|---|---|
| *F02D 41/18* | (2006.01) |
| *F02D 41/00* | (2006.01) |
| *F02B 47/08* | (2006.01) |
| *F02D 29/06* | (2006.01) |

(52) U.S. Cl.
CPC .............. *F02D 41/18* (2013.01); *F02B 47/08* (2013.01); *F02D 29/06* (2013.01); *F02D 41/0072* (2013.01); *F02D 2041/0075* (2013.01); *F02D 2200/0414* (2013.01); *F02D 2200/0806* (2013.01); *Y02T 10/144* (2013.01)

(58) Field of Classification Search
CPC ...... F02D 41/18; F02D 41/0072; F02D 29/06; F02D 2041/0075; F02D 2200/0806; F02D 2200/0414; F02B 47/08; Y02T 10/144
See application file for complete search history.

(56) References Cited

U.S. PATENT DOCUMENTS

| | | | |
|---|---|---|---|
| 2014/0360163 A1* | 12/2014 | Kurtz | F02D 41/0052 60/274 |
| 2016/0131006 A1* | 5/2016 | Kurtz | F02D 41/0052 60/274 |

* cited by examiner

*Primary Examiner* — Brandon Lee
(74) *Attorney, Agent, or Firm* — Quinn IP Law

(57) ABSTRACT

A method of operating an internal combustion engine having a turbocharger for pressurizing an intake airflow and an after-treatment (AT) system including an AT device for reducing nitrogen oxides ($NO_X$) concentration in the engine exhaust gas. The method includes operating the engine with a variable high-pressure exhaust gas recirculation (EGR) and low-pressure EGR split in the intake airflow. The method also includes determining the $NO_X$ concentration in the exhaust gas and determining a current high-pressure EGR to low-pressure EGR split in the intake airflow. The method additionally includes determining an EGR corrective factor using the determined current high-pressure EGR to low-pressure EGR split and applying the determined EGR corrective factor to the determined $NO_X$ concentration to generate a corrected $NO_X$ concentration. Furthermore, the method includes regulating operation of the AT system to treat the exhaust gas via the AT device in response to the generated corrected $NO_X$ concentration.

20 Claims, 3 Drawing Sheets

DETERMINATION OF NITROGEN OXIDE CONCENTRATION IN ENGINE EXHAUST GAS

INTRODUCTION

The present disclosure relates to determination of nitrogen oxide ($NO_X$) emissions concentration in exhaust gas of an internal combustion engine.

Modern internal combustion engines typically employ exhaust gas after-treatment (AT) systems that include particulate filters and other devices to effectively limit exhaust emissions from internal combustion engines. One of the exhaust after-treatment devices frequently used in a modern lean burn internal combustion engine, such as a compression-ignition or diesel type, is a selective catalytic reduction (SCR) catalyst.

The SCR is configured to convert nitrogen oxides ($NO_X$) into diatomic nitrogen ($N_2$) and water ($H_2O$) with the aid of the $NO_2$ generated by another exhaust after-treatment device, typically the diesel oxidation catalyst (DOC). For effective removal of $NO_X$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) into the exhaust gas flow, when the reductant is employed in diesel engines. Such a reductant may be an aqueous solution of urea that includes water and ammonia.

To facilitate the SCR conversion process and assure effective reduction and/or removal of $NO_X$ emissions, an effective determination of the $NO_X$ concentration in the engine out gas stream may be essential.

SUMMARY

A method of operating an internal combustion engine having a turbocharger configured to pressurize an intake airflow and an exhaust after-treatment (AT) system including an AT device configured to reduce a concentration of nitrogen oxide ($NO_X$) in an exhaust gas generated by the engine. The engine may be a compression-ignition engine. The method includes operating the engine with a variable high-pressure exhaust gas recirculation (EGR) and low-pressure EGR split in the intake airflow. The method also includes determining the concentration of $NO_X$ in the exhaust gas and determining a current high-pressure EGR to low-pressure EGR split in the intake airflow. The method additionally includes determining an EGR corrective factor using the determined current high pressure EGR to low pressure EGR split and applying the determined EGR corrective factor to the determined concentration of $NO_X$ in the exhaust gas to generate a corrected concentration of $NO_X$. Furthermore, the method includes regulating operation of the AT system to treat the exhaust gas via the AT device in response to the generated corrected concentration of $NO_X$.

The method may be performed via an electronic controller programmed with at least one data look-up table. In such a case, determining the concentration of $NO_X$ in the exhaust gas may include accessing the at least one data look-up table.

The engine may include a fuel injector supplied with fuel via an injector rail and configured to inject the fuel into the engine. Accessing the at least one data look-up table may include accessing a first data look-up table. In such a case, the method may further include determining a temperature of the intake airflow. Additionally, the method may include determining a fuel rail pressure and a fuel injector timing used to operate the engine; determining a number of injections of fuel; determining an intake-exhaust pressure ratio; determining an ambient humidity; and determining an ambient pressure. The method may also include determining the concentration of $NO_X$ using the determined temperature of the intake airflow, fuel rail pressure, fuel injector timing, number of injections of fuel, intake-exhaust pressure ratio, ambient pressure, and ambient humidity in the first data look-up table.

Accessing the at least one data look-up table may include determining the EGR corrective factor via accessing a second data look-up table.

Accessing the at least one data look-up table may also include applying the determined EGR corrective factor to the determined concentration of $NO_X$ in the exhaust gas via accessing a third data look-up table to generate the corrected concentration of $NO_X$.

The method may additionally include determining a temperature of the engine; determining an engine temperature corrective factor using the determined temperature of the engine; and applying the determined engine temperature corrective factor to the determined concentration of $NO_X$ in the exhaust gas to generate a further corrected concentration of $NO_X$. The method may also include regulating operation of the AT system to treat the exhaust gas via the AT device in response to the generated further corrected concentration of $NO_X$.

Accessing the at least one data look-up table may include determining the engine temperature corrective factor via accessing a fourth data look-up table. Such a determination of the engine temperature corrective factor may be based on actual engine speed and engine load.

The first through fourth data look-up tables may be sub-tables of a master data look-up table programmed into the controller.

Determining the temperature of the engine may include detecting, via a sensor, a coolant temperature of the engine.

The AT device may be a selective catalytic reduction (SCR) catalyst. In such a case, regulating operation of the AT system may include injecting a reductant into the exhaust gas upstream of the SCR catalyst.

An after-treatment (AT) system for an exhaust gas generated by an internal combustion engine employing a controller configured to perform the above method is also disclosed.

A vehicle employing the above-described AT system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
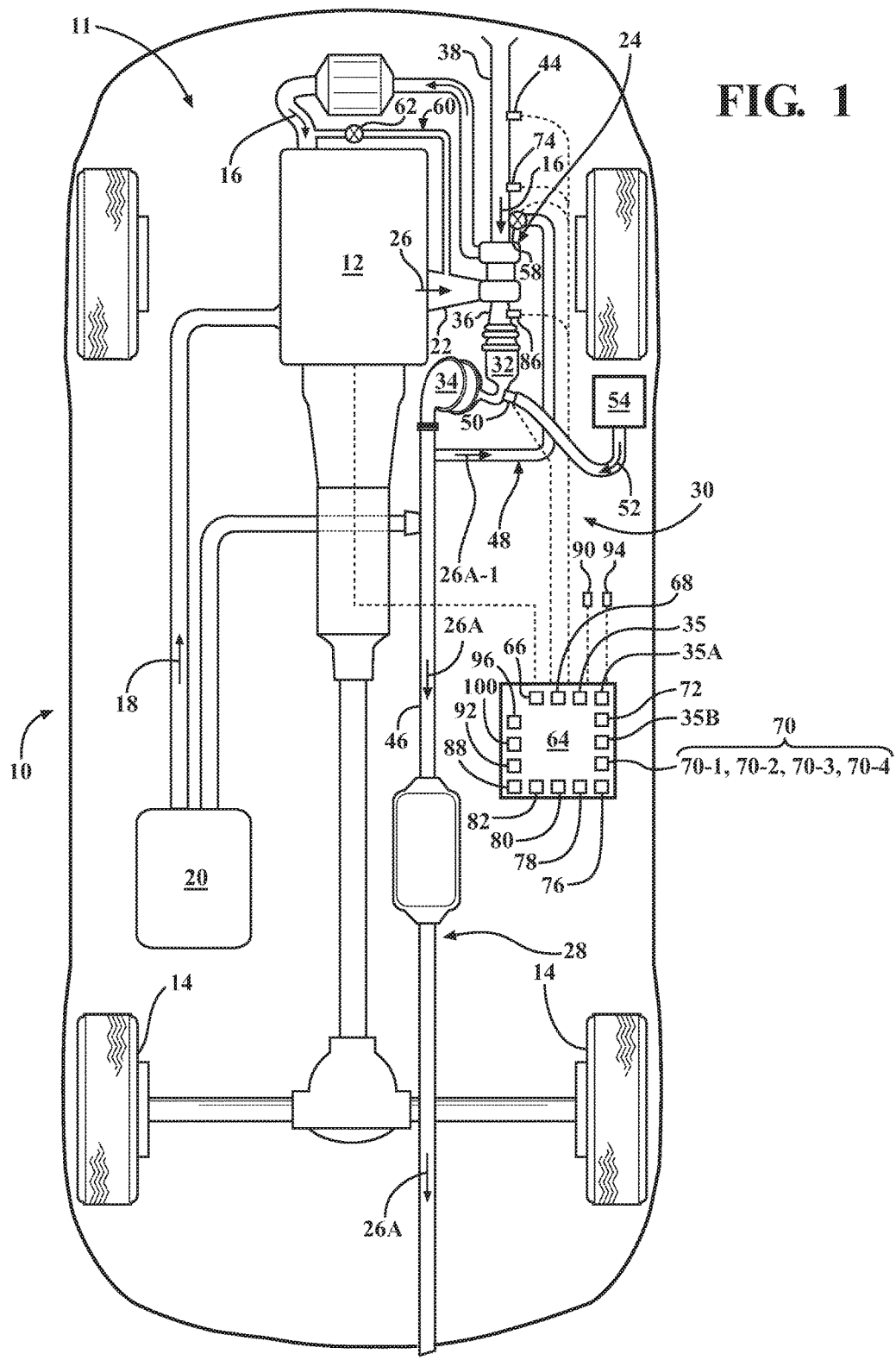
FIG. 1 is a schematic plan view of a vehicle having an internal combustion engine connected to an exhaust system having an after-treatment (AT) system with a number of AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a compression-ignition or diesel type of an engine. Generally, internal combustion in a diesel engine 12 occurs when a specific amount of ambient intake airflow 16 is mixed with a metered amount of fuel 18 supplied from a fuel tank 20 and the resultant air-fuel mixture is compressed inside the engine's cylinders 13 (shown in FIG. 2).

As shown, the engine 12 may include an exhaust manifold 22 configured to collect exhaust gas from the engine's cylinders 13. The engine also includes a turbocharger 24 in fluid communication with cylinders 13, such as via the exhaust manifold 22. The turbocharger 24 is energized or driven by a flow of exhaust gas, specifically the exhaust gas 26 released by individual cylinders 13 of the engine 12, such as through the exhaust manifold 22, following each combustion event. The turbocharger 24 is connected to an exhaust system 28 that receives exhaust gas 26 and eventually releases the exhaust gas to the ambient, typically on a side or aft of the vehicle 10. The turbocharger 24 also uses the exhaust gas 26 flow to pressurize the intake airflow 16. The turbocharger 24 may be configured as a variable-geometry turbocharger (VGT). A VGT is typically designed to allow the effective aspect ratio (A:R) of the turbocharger to be altered in line with engine speed, and thus facilitate increased engine operating efficiency.

The variable geometry of such a VGT is frequently achieved via a variable position vane mechanism (not shown). VGTs tend to be more common on compression-ignition or diesel engines, as compared to spark-ignition or gasoline engines, because lower exhaust temperatures of a diesel engine provides a less extreme environment for the movable components of the VGT. Although the engine 12 is depicted as having the exhaust manifold 22 attached to the engine structure, the engine may include exhaust passage(s) 22A such as generally formed in exhaust manifolds. In such a case, the above passage(s) 22A may be incorporated into the engine structure, such as the engine's cylinder head(s).

Figure 2:
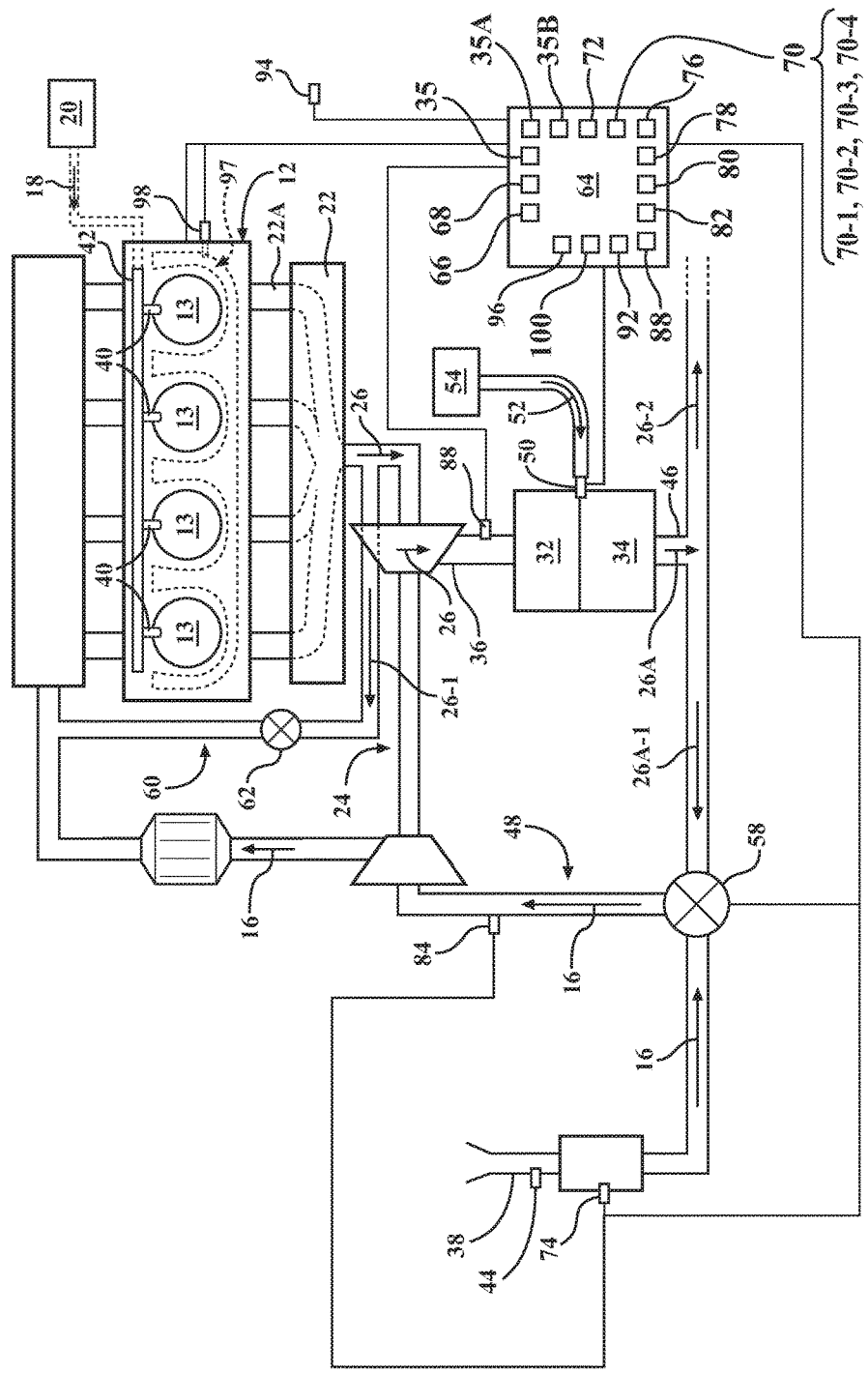
FIG. 2 is a schematic illustration of the internal combustion engine connected to the exhaust system with the AT shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas 26. As shown in FIGS. 1 and 2, the AT system 30 operates as part of the exhaust system 28. The AT system 30 includes at least one AT device, such as a first AT device 32 arranged downstream of the turbocharger 24 and a second AT device 34 arranged downstream of the first AT device. The first AT device 32 may be close-coupled to the turbocharger 24 and arranged inside an engine compartment 11 of the vehicle 10 for close proximity to the engine 12. Such close-coupling of the first AT device 32 to the engine 12 may provide a compact packaging arrangement that minimizes time for activation, i.e., light-off, of the AT system 30 in after-treatment of the exhaust gas 26 following a cold-start of the engine 12. The AT system may also include additional AT devices (not shown) positioned in the exhaust gas flow downstream of the first and second AT devices 32, 34.

As shown, the first AT device 32 may be a diesel oxidation catalyst (DOC), while the second AT device 34 may be a selective catalytic reduction (SCR) catalyst. The primary function of the DOC is reduction of carbon monoxides (CO) and non-methane hydrocarbons (NMHC). When present, the DOC is additionally configured to generate nitrogen dioxide ($NO_2$), which may be used by the SCRF arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas 26 flow prior to the gas reaching the DOC.

The primary function of the SCR is to reduce a concentration 35 of nitrogen oxides ($NO_X$) in the exhaust gas 26. Reduction of $NO_X$ is generally performed via a conversion of $NO_X$ into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas 26. The SCR may be close-coupled to the DOC and be further encased in a common housing therewith to reduce a loss of thermal energy as the exhaust gas 26 flows from the DOC to the SCR.

The AT system 30 also includes the exhaust passage 22A, which may be part of the exhaust manifold 22, configured to carry the flow of exhaust gas 26 to the turbocharger 24 from the engine's cylinders 13, and an exhaust passage 36 configured to carry the flow of exhaust gas 26 aft of the turbocharger 24 to the first AT device 32. The intake airflow 16 is supplied to the engine 12 via an intake passage 38 for mixing with the fuel 18, to generate combustion, thereby operate the engine, and generate a flow of the exhaust gas 26. The engine 12 may include a fuel injector 40 supplied with the fuel 18 via an injector rail 42 and configured to inject the fuel into the engine's cylinders. An airflow sensor 44 may be arranged in the intake passage 38 and configured to detect an amount of the airflow 16 supplied to the engine 12 during its operation. An exhaust gas passage 46 is configured to receive treated exhaust gas 26A aft of the second AT device 34 and pass the treated exhaust gas through the rest of the exhaust system 28 and the remainder of the AT system 30.

The AT system 30 also includes a first exhaust gas recirculation (EGR) passage 48. The first EGR passage 48 is configured to recirculate a portion 26A-1 of the treated exhaust gas 26A from the exhaust gas passage 46 to the intake passage 38, while the remainder 26-2 of the treated exhaust gas is directed through the rest of the exhaust system 28. Also, as part of the AT system 30, an injector 50 may be configured to inject a reductant 52 into the exhaust gas 26 upstream of the SCR catalyst. In diesel engine applications, the reductant 52 typically contains ammonia ($NH_3$), such as an aqueous solution of urea, a.k.a., diesel-exhaust-fluid (DEF). As shown in FIG. 1, the injector 50 may receive the reductant 52 from a refillable reservoir 54. Accordingly, in such an embodiment, the SCR embodiment of the second AT device 34 is configured to treat the exhaust gas 26 using the injected reductant 52.

As shown in FIG. 2, the AT system 30 also includes an exhaust pressure modulation (EPM) valve 58 configured to regulate passage of the portion 26A-1 of the treated exhaust gas 26A through the first EGR passage 48. In such an embodiment, the EPM valve 58 regulates the first EGR passage 48 to recirculate the portion 26A-1 of the treated exhaust gas 26A by redirecting the treated exhaust gas from the exhaust gas passage to the turbocharger 24. To promote durability of the turbocharger 24, the recirculation of the portion 26A-1 of the treated exhaust gas 26A flow to the turbocharger is accomplished via the EPM valve 58 as a low pressure exhaust gas recirculation (LPEGR), i.e., redirected into the unpressurized intake airflow 16 upstream of the turbocharger 24.

With continued reference to FIG. 2, the AT system 30 also includes a second EGR passage 60 configured to recirculate a portion 26-1 of untreated exhaust gas 26 from the exhaust manifold 22/exhaust passage 22A, upstream of the turbocharger 24, back to the engine's cylinders 13. The AT system 30 additionally includes an EGR valve 62 configured to regulate passage of the portion 26-1 of the untreated exhaust gas 26 through the second EGR passage 60. The recirculated the portion 26-1 of the untreated exhaust gas 26 flow via the EGR valve 62 is accomplished as a high pressure exhaust gas recirculation (HPEGR) i.e., redirected into the pressurized intake airflow 16 upstream of the cylinders 13.

The vehicle 10 additionally includes an electronic controller 64 configured to regulate the AT system 30, and, as such, the controller may be part of the AT system. The controller 64 may be a stand-alone unit, or be part of an electronic control unit (ECU) that regulates the operation of engine 12. The controller 64 is arranged on the vehicle 10 and includes a processor and a readily accessible non-transitory memory. Instructions for controlling operation of the AT system 30 are programmed or recorded in the memory of the controller 64 and the processor is configured to execute the instructions from the memory during operation of the vehicle 10. The controller 64 is generally programmed to regulate the injector 50 for introducing the reductant 52 upstream of the SCR second AT device 34, i.e., between the first and second AT devices 32, 34, during operation of the engine 12. The controller 64 is also programmed to determine operating efficiency of the second AT device 34 and reduce the concentration 35 of $NO_X$ in the exhaust gas 26 without using a dedicated $NO_X$ sensor.

The controller 64 is also programmed to operate the engine 12 with a variable high-pressure EGR and low-pressure EGR split in the intake airflow 16. The controller 64 is also programmed to determine a current high-pressure EGR to low-pressure EGR split 66 in the intake airflow 16. The controller 64 is additionally programmed to determine an EGR corrective factor 68 using the determined current high pressure EGR to low pressure EGR split 66. Additionally, the controller 64 is programmed to apply the determined EGR corrective factor 68 to the determined concentration 35 of $NO_X$ in the exhaust gas 26 to generate a corrected concentration 35A of $NO_X$. Furthermore, the controller 64 is programmed to regulate operation of the AT system 30 to treat the exhaust gas 26 via the second AT device 34 in response to the generated corrected concentration 35A of $NO_X$. Such regulating the AT system 30 may include introducing the reductant 52 via the injector 50, as well as regulating an amount of the injected reductant, upstream of the SCR second AT device 34 in response to the corrected concentration 35A of $NO_X$ to thereby reduce the $NO_X$ concentration in the exhaust gas 26 stream.

The controller 64 may be programmed with at least one data look-up table, generally indicated with a numeral 70. Furthermore, the controller 64 is programmed to determine the concentration 35 of $NO_X$ in the exhaust gas 26 via accessing the subject data look-up table(s), which may include at least a first data look-up table 70-1. With reference to FIG. 2, the controller 64 may also be programmed to determine a temperature 72 of the intake airflow 16. To determine the temperature 72 of the intake airflow 16, the controller 64 may be in electronic communication with a sensor 74 configured to detect the airflow temperature. The controller 64 may additionally be programmed to determine a pressure 76 in the injector rail 42 and injection timing 78 of the fuel injector 40 used to operate the engine 12. The controller 64 may also be programmed to determine a number of injections 80 of fuel 18 per engine cycle.

The controller 64 may additionally be programmed to determine an intake-exhaust pressure ratio 82, which would include a determination detection of intake pressure, such as via a dedicated sensor 84 upstream of the turbocharger 24, and a determination of the exhaust pressure, such as via a respective sensor 86 downstream of the turbocharger 24. The controller 64 may also be programmed to determine an ambient pressure 88, such as via communication with a specific sensor 90 (shown in FIG. 1) configured to detect the ambient pressure. The controller 64 may additionally be programmed to determine an ambient humidity 92, such via communication with a specific sensor 94 (shown in FIG. 1) configured to detect the ambient humidity. Furthermore, the controller 64 may be programmed to determine the concentration 35 of $NO_X$ via accessing the determined temperature 72 of the intake airflow 16, fuel rail pressure 76, fuel injector timing 78, number of fuel injections 80, intake-exhaust pressure ratio 82, ambient pressure 88, and ambient humidity 92 in the first data look-up table 70-1.

The AT system 30 may further include a second data look-up table 70-2 as part of the look-up table(s) 70. In such an embodiment of the AT system 30, the controller 64 may be programmed to determine the EGR corrective factor 68 via accessing the second data look-up table 70-2. The AT system 30 may further include a third data look-up table 70-3. In such an embodiment of the AT system 30, the controller 64 may be programmed to apply the determined EGR corrective factor 68 to the determined concentration 35 of $NO_X$ in the exhaust gas 26 via accessing the third data look-up table 70-3 to generate the corrected concentration 35A of $NO_X$.

The controller 64 may be additionally programmed to determine a temperature 96 of the engine 12. The temperature 96 of the engine 12 may be represented by a temperature of engine coolant 97, as detected by a sensor 98. Accordingly, the controller 64 may be in electronic communication with the sensor 98 and configured to receive from the subject sensor a signal indicative of the detected coolant temperature 96. The controller 64 may also be programmed to determine an engine temperature corrective factor 100 using the determined temperature 96 of the engine 12. The controller 64 may be additionally programmed to apply the determined engine temperature corrective factor 100 to the determined concentration 35 of $NO_X$ in the exhaust gas 26 to generate a further corrected concentration 35B of $NO_X$. The controller 64 may be further programmed to regulate operation of the AT system 30 to treat the exhaust gas 26 via the second AT device 34 in response to the generated further corrected concentration 35B of $NO_X$.

The data look-up table(s) 70 may also include a fourth data look-up table 70-4. In such an embodiment, the controller 64 may be additionally programmed to determine the engine temperature corrective factor 100 via accessing the fourth data look-up table 70-4. Such a determination of the engine temperature corrective factor 100 may be based on determined speed and load of the engine 12 being cross-referenced or correlated with empirically derived engine speed and load data points in the fourth data look-up table 70-4. The first through fourth data look-up tables, i.e., tables 70-1 through 70-4, may be sub-tables of a master data look-up table programmed into the controller, such as the generally indicated data look-up table 70.

Overall, as described, the AT system 30 uses the controller 64 to continuously monitor operation of the engine 12 and the AT system. Additionally the controller 64 is programmed to determine operating efficiency of the second AT device 34 and reduce the concentration 35 of $NO_X$ in the exhaust gas 26 without using a dedicated $NO_X$ sensor. Additionally, the controller 64 may be programmed with a series of empirically derived look-up data tables 70 to determine the concentration 35 of $NO_X$ in the exhaust gas 26. Furthermore, the AT system 30 uses the controller 64 to treat the exhaust gas 26 via the second AT device 34 in response to the generated corrected concentration 35A and/or further corrected concentration 35B of $NO_X$ to effectively reduce concentration of $NO_X$ in the exhaust gas.

Figure 3:
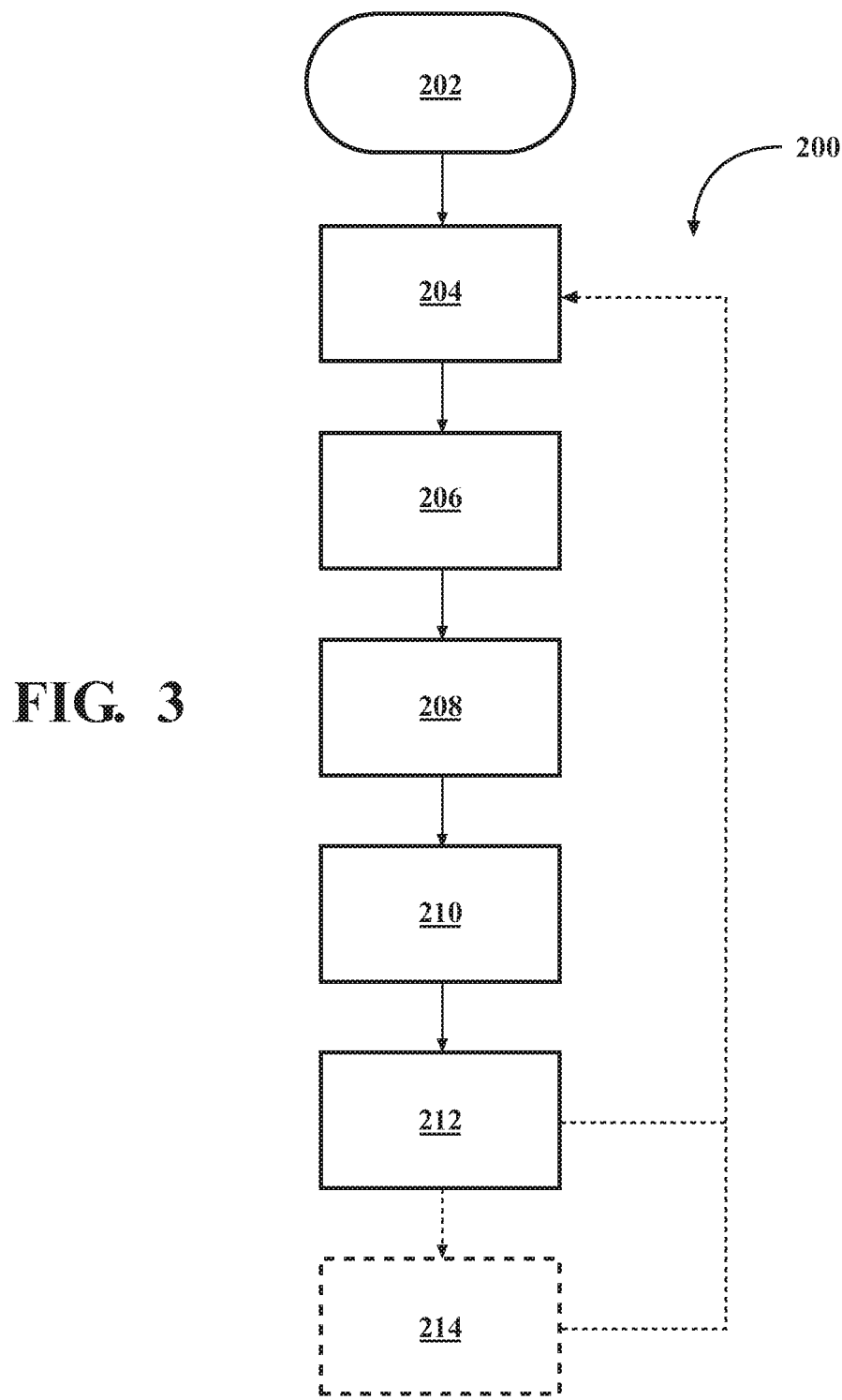
FIG. 3 is a flow diagram of a method of operating the engine and its AT system shown in FIGS. 1 and 2.

FIG. 3 depicts a method 200 of operating the engine 12 employing the after-treatment (AT) system 30 having, among other elements, the second after-treatment (AT) device 34, for example configured as the selective catalytic reduction (SCR) catalyst, as described above with respect to FIGS. 1 and 2. The method 200 may be performed via the electronic controller 64 programmed with at least one data look-up table 70. The method 200 initiates in frame 202 with the operating the engine 12 with the variable high-pressure and low-pressure EGR split in the intake airflow 16. Throughout the method, and starting with frame 202, the method generally includes supplying predetermined amounts of airflow 16 and fuel 18 to the engine 12. Following frame 202, the method proceeds to frame 204, where the method includes determining the concentration 35 of $NO_X$ in the exhaust gas 26.

In frame 204, the determination of the concentration 35 of $NO_X$ in the exhaust gas 26 may include accessing the data look-up table(s) 70 via the controller 64. Additionally, in frame 204, the determination of the concentration 35 of $NO_X$ in the exhaust gas 26 may include determining, such as detecting via the sensor 74 the temperature 72 of the intake airflow 16; determining the fuel rail 42 pressure 76 and the fuel injector 40 timing 78 used to operate the engine 12; determining the number of injections 80 of fuel 18 per engine cycle; determining an intake-exhaust pressure ratio 82 which results from the operation of the turbocharger 24; determining, such as detecting via the sensor 90, the ambient pressure 88; and determining, such as detecting via the sensor 94, the ambient humidity 92. Furthermore, in frame 204 the method may also include determining, via the controller 64, the concentration 35 of $NO_X$ using the determined temperature 72 of the intake airflow 16, fuel rail pressure 76, fuel injector timing 78, number of injections 80 of fuel 18, intake-exhaust pressure ratio 82, ambient pressure 88, and ambient humidity 92 in the first data look-up table 70-1.

After frame 204, the method advances to frame 206. In frame 206, the method includes determining a current high-pressure EGR to low-pressure EGR split 66 in the intake airflow 16. Following frame 206 the method proceeds to frame 208, where the method includes determining the EGR corrective factor 68 using the determined current high pressure EGR to low pressure EGR split 66. In frame 208, the method may also include accessing the second data look-up table 70-2 via the controller 64 to determine the EGR corrective factor 68. After frame 208, the method advances to frame 210. In frame 210 the method includes applying the determined EGR corrective factor 68 to the determined concentration 35 of $NO_X$ in the exhaust gas 26 to generate the corrected concentration 35A of $NO_X$.

In frame 210 the method may also include accessing the third data look-up table 70-3 via the controller 64 to apply the determined EGR corrective factor 68 to the determined concentration 35 of $NO_X$ in the exhaust gas 26 to generate the corrected concentration 35A of $NO_X$. Following frame 210, the method moves on to frame 212. In frame 212 the method includes regulating operation of the AT system 30 to treat the exhaust gas 26 via the second AT device 34 in response to at least the generated corrected concentration 35A of $NO_X$. The above treatment of the exhaust gas 26 via the second AT device 34 is intended to reduce $NO_X$ concentration in the exhaust gas stream without using a dedicated $NO_X$ sensor to detect the concentration of $NO_X$.

After frame 212, the method may advance to frame 214. In frame 214 the method may include determining the temperature 96 of the engine 12, such as by detecting the temperature of the engine coolant 97 via the sensor 98; determining an engine temperature corrective factor 100 using the determined temperature 96 of the engine 12; and applying the determined engine temperature corrective factor 100 to the determined concentration 35 of $NO_X$ in the exhaust gas 26 to generate a further corrected concentration 35B of $NO_X$. The determination of the engine temperature corrective factor 100 may be accomplished via the controller 64 accessing the fourth data look-up table 70-4 by correlating empirically determined speed and load of the engine 12 with the engine temperature corrective factor 100. Additionally, in frame 214, the method may include the controller 64 regulating operation of the AT system 30 to treat the exhaust gas 26 via the second AT device 34 in response to the generated further corrected concentration 35B of $NO_X$.

Following either frame 212 or 214, the method may loop back to frame 204 for continued determination of concentration 35 of $NO_X$ in the exhaust gas 26. Accordingly, the controller 64 may be programmed to continuously monitor operation of the engine 12 and the AT system 30 for determination of the corrected concentration 35A of $NO_X$ and regulation of the second AT device 34 in response thereto. Additionally, such determination of at least the corrected 35A $NO_X$ concentration in the exhaust gas 26 enables the method 200 to monitor operating efficiency of the second AT device 34 and effectively reduce concentration of $NO_X$ in the exhaust gas 26 without using a dedicated $NO_X$ sensor to physically detect $NO_X$ concentration.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating an internal combustion engine having a turbocharger configured to pressurize an intake airflow and an exhaust after-treatment (AT) system including an AT device configured to reduce a concentration of nitrogen oxides ($NO_X$) in an exhaust gas generated by the engine, comprising:
    operating the engine with a variable high-pressure exhaust gas recirculation (EGR) and low-pressure EGR split in the intake airflow;
    determining the concentration of $NO_X$ in the exhaust gas;
    determining a current high-pressure EGR to low-pressure EGR split in the intake airflow;
    determining an EGR corrective factor using the determined current high-pressure EGR to low-pressure EGR split;
    applying the determined EGR corrective factor to the determined concentration of $NO_X$ in the exhaust gas to generate a corrected concentration of $NO_X$; and
    regulating operation of the AT system to treat the exhaust gas via the AT device in response to the generated corrected concentration of $NO_X$.

2. The method of claim 1, wherein the method is performed via an electronic controller programmed with at least one data look-up table, and wherein determining the concentration of $NO_X$ in the exhaust gas includes accessing the at least one data look-up table.

3. The method of claim 2, wherein the engine includes a fuel injector supplied with fuel via an injector rail and configured to inject the fuel into the engine, wherein accessing the at least one data look-up table includes accessing a first data look-up table, the method further comprising:
    determining a temperature of the intake airflow;
    determining a fuel rail pressure and a fuel injector timing used to operate the engine;
    determining a number of injections of fuel per engine cycle;
    determining an intake-exhaust pressure ratio;
    determining an ambient pressure;
    determining an ambient humidity; and
    determining the concentration of $NO_X$ using the determined temperature of the intake airflow, fuel rail pressure, fuel injector timing, number of injections of fuel, intake-exhaust pressure ratio, ambient pressure, and ambient humidity in the first data look-up table.

4. The method of claim 3, wherein accessing the at least one data look-up table includes determining the EGR corrective factor via accessing a second data look-up table.

5. The method of claim 4, wherein accessing the at least one data look-up table includes applying the determined EGR corrective factor to the determined concentration of $NO_X$ in the exhaust gas via accessing a third data look-up table to generate the corrected concentration of $NO_X$.

6. The method of claim 5, further comprising:
    determining a temperature of the engine;
    determining an engine temperature corrective factor using the determined temperature of the engine;
    applying the determined engine temperature corrective factor to the determined concentration of $NO_X$ in the exhaust gas to generate a further corrected concentration of $NO_X$; and
    regulating operation of the AT system to treat the exhaust gas via the AT device in response to the generated further corrected concentration of $NO_X$.

7. The method of claim 6, wherein accessing the at least one data look-up table includes determining the engine temperature corrective factor via accessing a fourth data look-up table.

8. The method of claim 7, wherein the first through fourth data look-up tables are sub-tables of a master data look-up table.

9. The method of claim 6, wherein determining the temperature of the engine includes detecting, via a sensor, a coolant temperature of the engine.

10. The method of claim 1, wherein the AT device is a selective catalytic reduction (SCR) catalyst, and wherein regulating operation of the AT system includes injecting a reductant into the exhaust gas upstream of the SCR catalyst.

11. An after-treatment (AT) system for an exhaust gas generated by an internal combustion engine having a turbocharger configured to pressurize an intake airflow, the AT system comprising:
    an AT device configured to reduce a concentration of nitrogen oxide ($NO_X$) in the exhaust gas; and
    an electronic controller programmed to:
        operate the engine with a variable high-pressure exhaust gas recirculation (EGR) and low-pressure EGR split in the intake airflow;
        determine the concentration of $NO_X$ in the exhaust gas;
        determine a current high-pressure EGR to low-pressure EGR split in the intake airflow;
        determine an EGR corrective factor using the determined current high pressure EGR to low pressure EGR split;
        apply the determined EGR corrective factor to the determined concentration of $NO_X$ in the exhaust gas to generate a corrected concentration of $NO_X$; and
        regulate operation of the AT system to treat the exhaust gas via the AT device in response to the generated corrected concentration of $NO_X$.

12. The AT system of claim 11, wherein the controller is programmed with at least one data look-up table, and wherein the controller is programmed to determine the concentration of $NO_X$ in the exhaust gas via accessing the at least one data look-up table.

13. The AT system of claim 12, wherein the engine includes a fuel injector supplied with fuel via an injector rail and configured to inject the fuel into the engine, wherein the at least one data look-up table includes a first data look-up table, and wherein the controller is additionally programmed to:
    determine a temperature of the intake airflow;
    determine a fuel rail pressure and a fuel injector timing used to operate the engine;
    determine a number of injections of fuel per engine cycle;
    determine an intake-exhaust pressure ratio;
    determine an ambient pressure;
    determine an ambient humidity; and
    determine the concentration of $NO_X$ via accessing the determined temperature of the intake airflow, fuel rail pressure, fuel injector timing, number of injections of fuel, intake-exhaust pressure ratio, ambient pressure, and ambient humidity in the first data look-up table.

14. The AT system of claim 13, wherein the at least one data look-up table includes a second data look-up table, and wherein the controller is programmed to determine the EGR corrective factor via accessing the second data look-up table.

15. The AT system of claim 14, wherein the at least one data look-up table includes a third data look-up table, and wherein the controller is programmed to apply the determined EGR corrective factor to the determined concentration of $NO_X$ in the exhaust gas via accessing the third data look-up table to generate the corrected concentration of $NO_X$.

16. The AT system of claim 15, wherein the controller is additionally programmed to:
   determine a temperature of the engine;
   determine an engine temperature corrective factor using the determined temperature of the engine;
   apply the determined engine temperature corrective factor to the determined concentration of $NO_X$ in the exhaust gas to generate a further corrected concentration of $NO_X$; and
   regulate operation of the AT system to treat the exhaust gas via the AT device in response to the generated further corrected concentration of $NO_X$.

17. The AT system of claim 16, wherein the at least one data look-up table includes a fourth data look-up table, and wherein the controller is additionally programmed to determine the engine temperature corrective factor via accessing the fourth data look-up table.

18. The AT system of claim 17, wherein the first through fourth data look-up tables are sub-tables of a master data look-up table.

19. The AT system of claim 16, wherein the controller is programmed to determine the temperature of the engine via a communication with a sensor configured to detect a coolant temperature of the engine.

20. The AT system of claim 11, wherein the AT device is a selective catalytic reduction (SCR) catalyst, and wherein the controller is additionally configured to regulate injection of a reductant into the exhaust gas upstream of the SCR catalyst.

* * * * *